(12) United States Patent
Risley et al.

(10) Patent No.: US 11,649,595 B2
(45) Date of Patent: May 16, 2023

(54) REVERSED INTERSTITIAL PADDLES

(71) Applicant: Astec, Inc., Chattanooga, TN (US)

(72) Inventors: Kevin Risley, Chattanooga, TN (US); Chase Walker, Hixson, TN (US); Michael C Varner, East Ridge, TN (US); Andrew Hobbs, Sheffield (GB); Greg Renegar, Ooltewah, TN (US)

(73) Assignee: Astec, Inc., Chattanooga, TN (US)

( * ) Notice: Subject to any disclaimer, the term of this patent is extended or adjusted under 35 U.S.C. 154(b) by 0 days.

(21) Appl. No.: 17/712,045

(22) Filed: Apr. 1, 2022

(65) Prior Publication Data

US 2022/0316150 A1 Oct. 6, 2022

Related U.S. Application Data

(60) Provisional application No. 63/170,170, filed on Apr. 2, 2021.

(51) Int. Cl.
 *E01C 19/00* (2006.01)
 *E01C 19/10* (2006.01)

(52) U.S. Cl.
 CPC .. *E01C 19/1027* (2013.01); *E01C 2019/1086* (2013.01)

(58) Field of Classification Search
 CPC .............. E01C 2019/1086; E01C 19/1027
 See application file for complete search history.

(56) References Cited

U.S. PATENT DOCUMENTS

| | | | |
|---|---|---|---|
| 3,845,941 A | 11/1974 | Mendenhall | |
| 5,380,082 A * | 1/1995 | Milstead | B01F 27/0726 432/118 |
| 6,196,710 B1 | 3/2001 | Swanson et al. | |
| 2004/0179422 A1 | 9/2004 | Hawkins | |
| 2007/0070801 A1 | 3/2007 | Musil et al. | |
| 2015/0059620 A1 | 3/2015 | Cox et al. | |

OTHER PUBLICATIONS

International Search Report and Written Opinion for PCT/US22/23176, dated Jul. 12, 2022, 10 pages.

* cited by examiner

*Primary Examiner* — Anshu Bhatia
(74) *Attorney, Agent, or Firm* — Chambliss, Bahner & Stophel, P.C.; Stephen D. Adams

(57) ABSTRACT

An inner drum for use in a dryer/mixer in connection with the production of an aggregate-binder mix includes a plurality of mixing paddles disposed on the outer surface of the inner drum and arranged in a plurality of rows. The mixing paddles are configured to rotate through a mixing chamber as the inner drum rotates within an outer drum of the dryer/mixer to mix aggregate and binder together. Interstitial spaces are formed between rows of mixing paddles and material leads, where aggregate material preferentially travels as the inner drum is rotated, extend along the mixing chamber. At least one interstitial mixing paddle is located on the outer surface of the inner drum and in one of the interstitial spaces at one of the material leads. The interstitial mixing paddle rotates through the mixing chamber as the inner drum rotates to also mix the aggregate and binder together.

16 Claims, 5 Drawing Sheets

REVERSED INTERSTITIAL PADDLES

CROSS-REFERENCE TO RELATED APPLICATIONS

This application claims the benefit of U.S. Provisional Application No. 63/170,170 filed Apr. 2, 2021, and entitled INTERSTITIAL REVERSE TIPS, which is incorporated herein by reference in its entirety.

FIELD

The present invention relates generally to dryer systems used in asphalt production plants. In particular, the present invention relates to improved systems and methods for mixing mineral aggregate with bituminous or other type aggregate and other aggregate binder material in hot mix asphalt (HMA) production equipment.

BACKGROUND

Production facilities for making asphalt concrete mixes to be used as a paving composition are well-known. Feed materials for these facilities include aggregate materials and asphalt cement, which serves as a binder for the asphalt concrete mix. The aggregate materials may be provided in the form of virgin aggregate materials or in the form of recycled asphalt product ("RAP"), which also provides an additional source of asphalt cement. In the production of HMA, these aggregates and binders are generally mixed in an approximate 95% to 5% ratio, by weight. It is preferable that these various aggregate sources be sufficiently dried, heated and mixed with binder and preferably completely coated with the binder.

Coating (i.e., the extent to which asphalt cement has covered the surface of the aggregate and has been absorbed by fines) is achieved through the use of various configurations of mixing and drying equipment. For example, some conventional asphalt concrete production plants employ a rotating dryer drum in which aggregates and binders are introduced. A burner is located at one end of the drum and the input feed materials are moved along the drum through the heated gases generated by the burner in either parallel flow or counter-current flow to an outlet. A separate mixer, such as a rotating drum mixer or a pugmill, is employed to mix the heated and dried aggregate materials with liquid asphalt cement.

Another type of asphalt concrete production plant employs a dryer/mixer that dries and heats the aggregate material and also mixes it with asphalt cement. With initial reference to FIG. 1, one such type of dryer/mixer is the DOUBLE BARREL® brand counterflow dryer/mixer 10 that is sold by Astec, Inc. of Chattanooga, Tenn. This dryer/mixer 10 includes a generally cylindrical outer drum 14 mounted on a common frame 16 in an inclined manner and a heating chamber comprised of a generally cylindrical inner drum 12 that is adapted to rotate with respect to the outer drum. The inner drum 12 is rotatably mounted on the frame 16 by a plurality of bearings 18 and is driven to rotate by a suitable motor 20. A burner 22 directs a flame 24 generally axially into the interior of inner drum 12.

Inner drum 12 has at its first (upper) end 26 a virgin aggregate inlet 28 and a combustion products outlet 30 and has at its second (lower) end 32 a plurality of openings 34 forming heated and dried virgin aggregate outlets. Inner drum 12 also supports a plurality of paddles 36 that are each mounted onto pedestals or shanks 50 and extend into a mixing chamber 38 formed between the inner drum 12 and the outer drum 14. Thus, the paddles 36 are generally located between the second (lower) end 32 and a middle portion 54 of the inner drum 12 that is located between first end 26 and the second end, wherein the location of the middle portion of the inner drum roughly corresponds with the upper end 60 of the outer drum. The interior of the inner drum 12 is functionally separated into a combustion zone located in the vicinity of the burner flame 24 and a drying zone located between the combustion zone and the first end 26 of the drum 12.

Outer drum 14 is separated from the inner drum 12 by a sufficient distance to form mixing chamber 38 which is sufficiently wide enough to provide clearance for the paddles 36. Outer drum 14 has an upper inlet 40, a virgin aggregate inlet 42 cooperating with the openings 34 of the inner drum 12, and an asphalt mix outlet 44. Outer drum 14 also receives suitable equipment (not shown) for injecting liquid asphalt into the mixing chamber 38.

In this particular case, in use, virgin aggregate is fed into the virgin aggregate inlet 28 of the inner drum 12 via a suitable conveyor 46 and is heated and dried as it travels downwardly through the inclined drum 12 counter to the direction of the flame 24 via direct exposure to the hot gases generated from the burner 22. Heated and dried aggregate in the second end 32 of the drum 12 falls through openings 34 in the drum, through the inlet 42 in the outer drum 14, and into the mixing chamber 38. RAP may be simultaneously fed into mixing chamber 38 from the upper inlet 40 by a suitable conveyor 48 and is mixed by the paddles 36 with the heated and dried virgin aggregate. Liquid asphalt is also normally injected at this time, thereby forming an asphalt paving mix. In addition to mixing the virgin aggregate, RAP, and liquid asphalt, the paddles 36 also convey the resulting mix to the mixing chamber outlet 44, where the mix is discharged from counterflow dryer 10. Combustion products formed during operation of counterflow dryer 10 rise out of the inner drum 12 through outlet 30 and are conveyed to a downstream device such as a baghouse.

In FIGS. 2 and 3, the inner drum 12 is shown in a flat "unrolled" configuration to provide a "layout map," which shows an outer surface 12A of the inner drum to which the paddles 36 are mounted. This type of layout map is often used in the industry to track changes and to provide clarity when making adjustments to the location and orientation of paddles 36 in a dryer/mixer 10. As illustrated by the layout map, paddles 36 extend along the length of the inner drum between the openings 34 at the second end 32 and approximately the middle portion 54 of the inner drum. Further, paddles 36 are placed into spaced-apart rows 56 that extend between the openings 34 and the middle portion 54 of the inner drum 12. Along each row 56, paddles 36 are spaced apart from one another to form an interstitial space 58 (shown in FIG. 3) through which a material lead 52 may pass.

Material leads 52 are essentially the pathways that aggregate material takes (traveling in the direction indicated by the arrow head) as it passes through the mixing chamber. In particular, in use, as the inner drum 12 rotates in direction R, aggregate travels through the mixing chamber by passing through the interstitial spaces 58 in direction F to asphalt mix outlet 44 (FIG. 1). If paddles 36 are positioned in such a way that material passes through the mixing chamber without contacting a paddle, there is a risk that the material will be insufficiently coated. For this reason, paddles 36 are ideally positioned along the rows 56 so that no asphalt mix exits the mixing chamber without contacting the paddles.

Conventional asphalt plant dryers, however, suffer from several disadvantages. For example, depending on (i) the nature of the aggregate type and gradation, (ii) the binder type, and (iii) other related factors, complete coating of the aggregate with the binder may be difficult to achieve. Additionally, since bituminous and other binders are, by their nature, meant to bind aggregates together to create a stable road surface, their physical nature is to be cohesive. Though this is a desirable property of the final HMA product, this cohesiveness can result in buildup of aggregate and binder on surfaces and components within the mixing equipment. Under some conditions, this buildup can then break away from the surfaces and components onto which they accrete, which may result in problematic contamination of the final HMA product.

Various attempts have been made to try to overcome these problems. For example, the configuration and pattern of mixing components (e.g., paddles 36) within the dryer/mixer 10 have been reconfigured in an attempt to improve desirable aggregate coating and to reduce undesirable buildup. In particular, various shapes of paddles 36 have been introduced to increase the level of shear and the orientation of the paddles have been changed to increase retention time of the aggregate and binder mixture (i.e., to slow the progress of aggregate and binder through the dryer/mixer). Other attempts have been made to reduce buildup and/or improve aggregate coating. These efforts include, but are not limited to, changes in the manner and location of binder injection, changes to the manner and location of dust introduction into the mixing process, use of various components to mechanically scrub surfaces onto which buildup accretes, post-production hydraulic cleaning, and the application of surface coatings and/or release agents/sprays to the surfaces of the dryer/mixer.

Certain of these various improvement attempts have been moderately effective in achieving the desired result of improved coating and reduced buildup. However, in several instances, they also caused other unintended consequences. In particular, the most notable of these consequences was an increase in the amount of power required to rotate the inner drum 12 during the mixing process to produce HMA product at the desired rate of production. Increasing the residence time of material within the inner drum 12 increases the depth of the material bed, which, in turn, requires increased power to turn the drum. Additionally, in many cases, the use of certain historically-successful paddle orientations within existing paddle configurations resulted in the dust inlet becoming fouled with accreted material to the point of malfunction.

Other attempts to solve the issues above has also resulted in marginal success under certain conditions, but that marginal success was not justified by the cost increases, maintenance increases, and other unintended consequences that they caused. For example, the location of dust introduction was changed such that dust was introduced later in the mixing process. While this change resulted in a decrease in the buildup of accreted material within the mixer/dryer, a desirable result, it also resulted in decreased coating performance, an undesirable result. Additionally, the mechanical scrubbing of surfaces provided some success. However, depending on the aggregate and binder properties, the components that were used to perform the scrubbing were, themselves, fouled with buildup. It was found that surface coatings and release agents/sprays were largely ineffective.

What is needed, therefore, is a dryer apparatus and production method that provides improved aggregate heating and aggregate coating (i.e., transfer of binder onto the aggregate surface), preferably providing complete aggregate coating, and that results in minimal to no buildup while also allowing for a desired production rate to be maintained at a minimum horsepower.

Notes on Construction

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY

The above and other problems are addressed by an inner drum for use in a dryer/mixer in connection with the production of an aggregate-binder mix. The dryer/mixer includes a fixed outer drum surrounding the inner drum such that the inner drum may rotate within the outer drum. A mixing chamber is formed between an outer surface of the inner drum and an inner surface of the outer drum, and virgin aggregate and a binder are mixed together to form an aggregate-binder mix in the mixing chamber. The dryer/mixer also includes an aggregate inlet through which virgin aggregate may be passed into the mixing chamber, a binder inlet through which a binder may be passed into the mixing chamber, and a mix outlet through which the aggregate-binder mix may be passed out of the mixing chamber The inner drum also includes a plurality of mixing paddles disposed on the outer surface of the inner drum and arranged in a plurality of rows. The mixing paddles are configured to rotate through the mixing chamber as the inner drum rotates within the outer drum and to mix together aggregate and binder located within the mixing chamber. An interstitial space is formed between each adjacent pair of rows of mixing paddles through which the aggregate and binder may pass. Material leads extend along the mixing chamber. When the inner drum is rotated, aggregate material preferentially travels along these material leads as a result of a location and orientation of the mixing paddles. At least one interstitial mixing paddle is located on the outer surface of the inner drum and is further located in one of the interstitial spaces at one of the material leads. The interstitial mixing paddle is configured to rotate through the mixing chamber as the inner drum rotates within the outer drum and to mix together aggregate and binder located within the mixing chamber. In certain embodiments, the interstitial mixing paddle is reversed in direction, compared to the other mixing paddles. In those cases, the mixing paddles induce movement in the aggregate material away from the aggregate inlet, whereas the interstitial mixing paddle induces movement in the aggregate material towards the aggregate inlet.

Also disclosed is a method for forming an aggregate mix that includes the step of providing a dryer/mixer according to an embodiment of the present invention, such as the dryer/mixer described above. The method also includes the steps of passing virgin aggregate into the mixing chamber via the aggregate inlet and passing asphalt into the mixing chamber via the asphalt inlet. Next, the method includes the step of inducing movement of a portion of the aggregate in a forward direction F away from the aggregate inlet and along the plurality of material leads with the plurality of mixing paddles by rotating the inner drum in a direction R with respect to the outer drum such that the aggregate is mixed with the asphalt to form an aggregate mix. Also, the method includes the step of inducing movement of at least a portion of the aggregate with the interstitial mixing paddle by rotating the inner drum in the direction R. Lastly, the method includes the step of passing the aggregate mix out of the mixing chamber via the mix outlet. In certain embodiments of the method, the movement induced by the interstitial mixing paddle is in a retrograde direction F' toward the aggregate inlet.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

Figure 1:
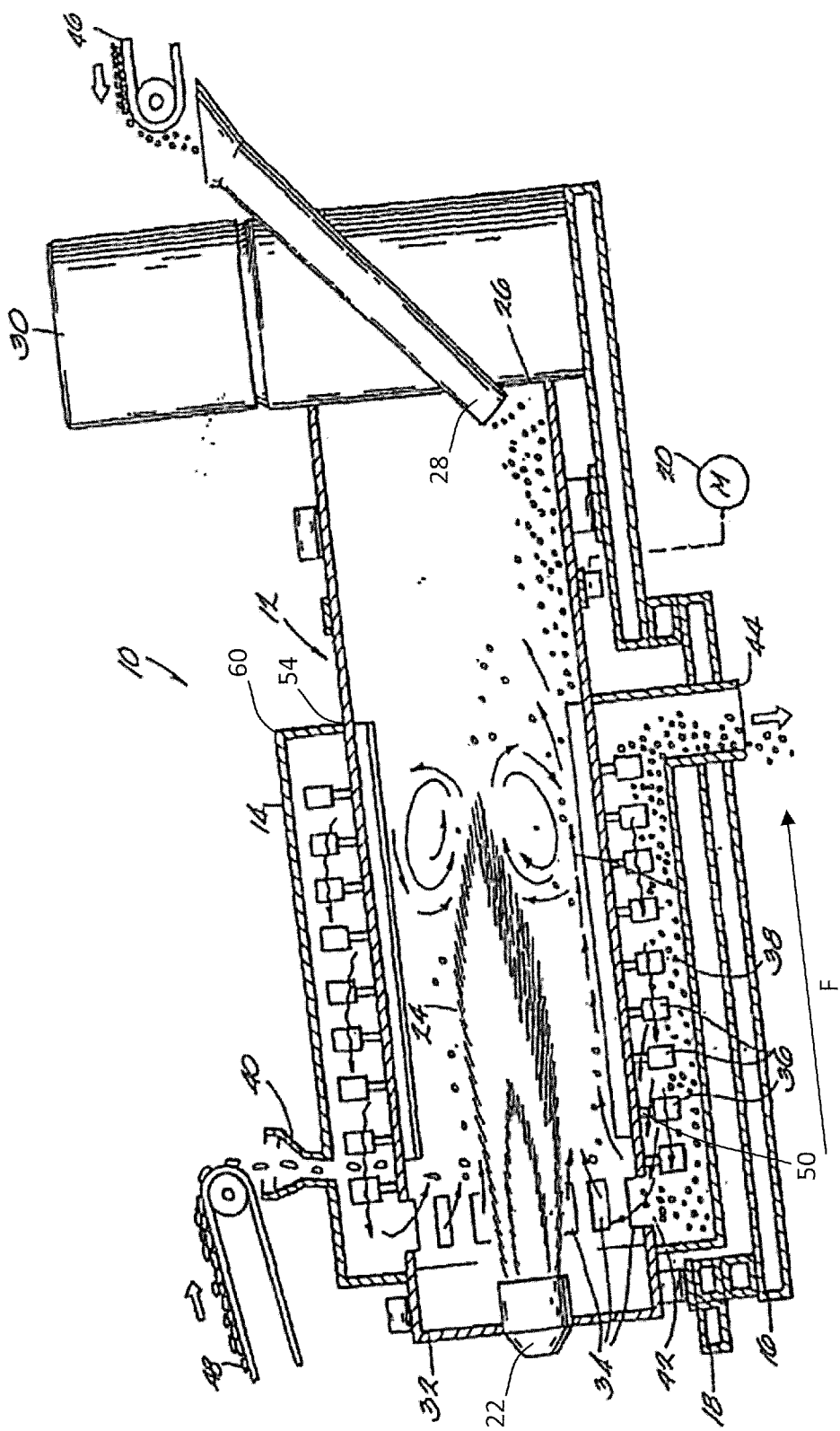
FIG. 1 is a sectional view of a conventional dryer/mixer used in an HMA system and production process.
Figure 2:
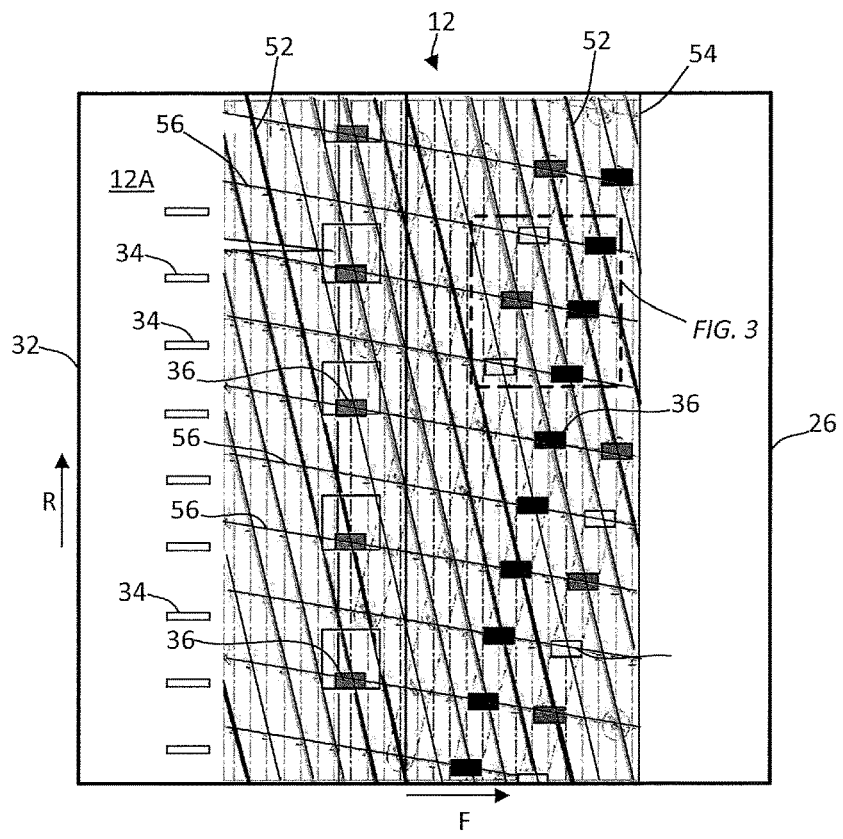
FIG. 2 is depicts an inner drum of the dryer/mixer of FIG. 1, shown in a flat unrolled configuration to provide a layout map.
Figure 3:
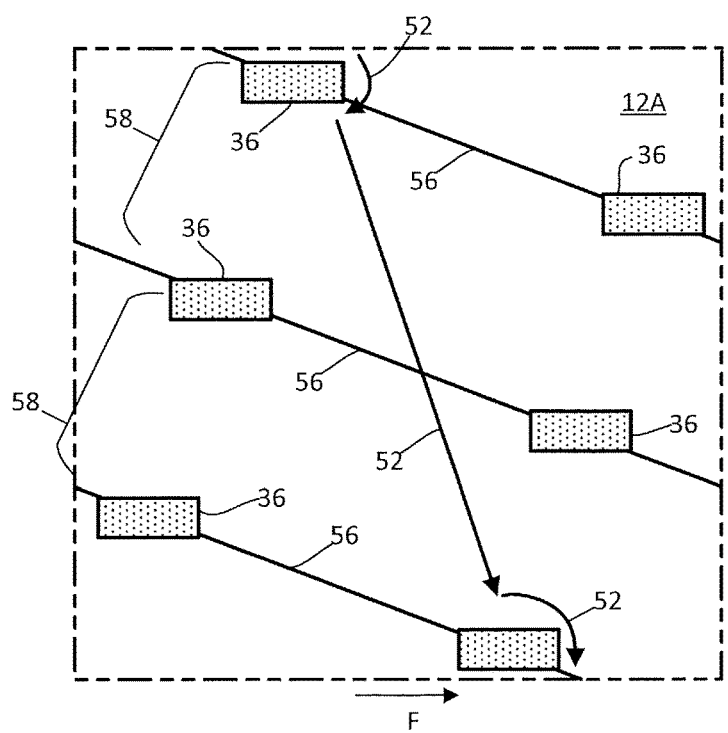
FIG. 3 is a detailed view of a boxed portion of the layout map of FIG. 2 denoted by "FIG. 3"
Figure 4:
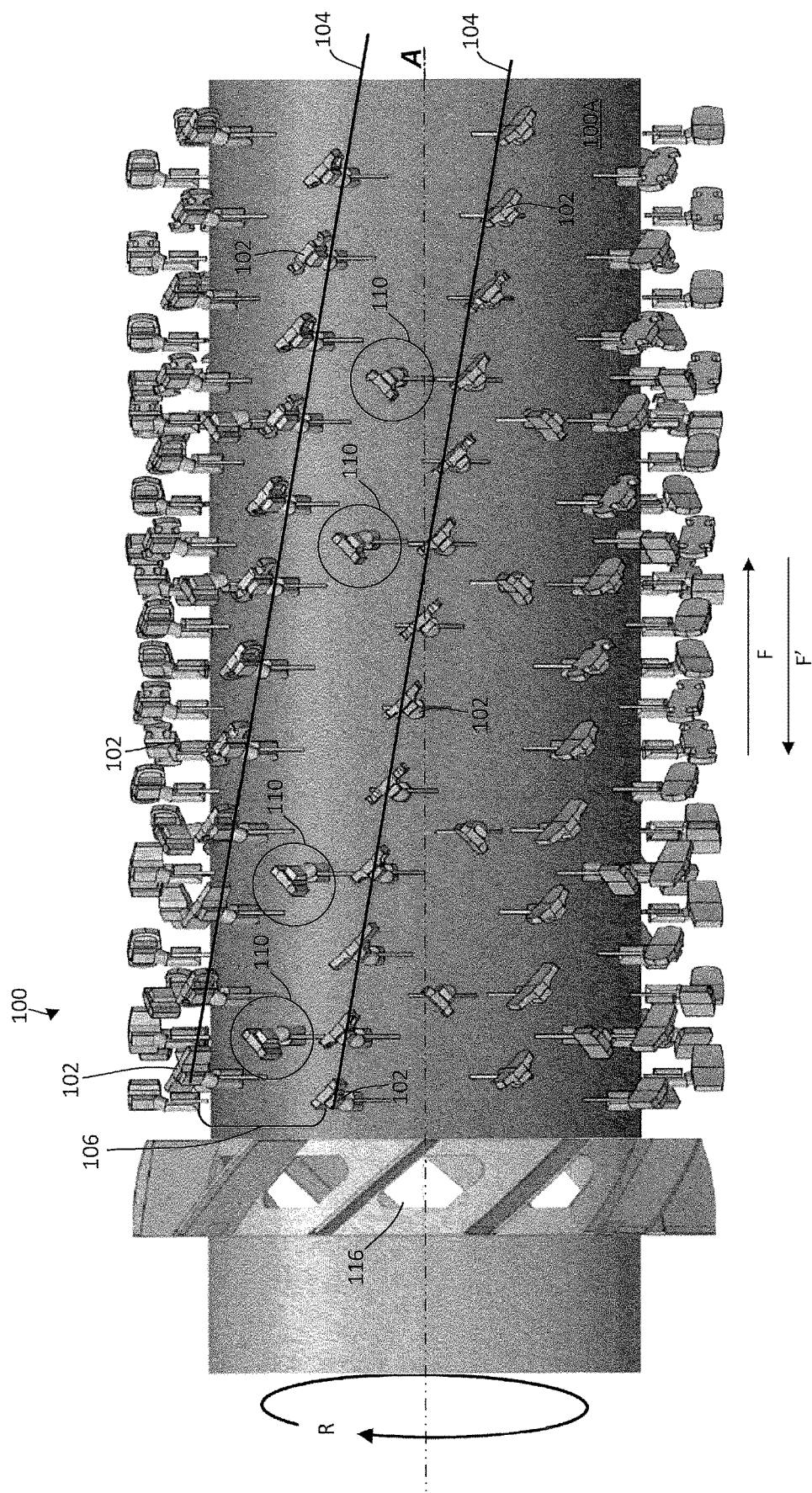
FIG. 4 depicts an inner drum configured for use in a HMA system and production process according to an embodiment of the present invention.

Referring now to the drawings in which like reference characters designate like or corresponding characters throughout the several views, there is shown in FIG. 4 an inner drum 100 for use in a dryer/mixer, such as dryer/mixer 10 (shown in FIG. 1) in place of inner drum 12, in connection with the production of an aggregate-binder mix. It is noted here that, in the embodiments illustrated by this disclosure, the binder is asphalt and the inner drum 100 is used for the batch production of asphalt concrete in an HMA system and production process. However, the inner drum 100, including as part of a dryer/mixer, and also the methods disclosed herein may also be used in other industries as well.

As above, the dryer/mixer preferably includes a fixed outer drum designed to surround the inner drum 100 such that the inner drum may rotate within the outer drum. A mixing chamber is formed between an outer surface of the inner drum and an inner surface of the outer drum. Virgin aggregate and a binder may be mixed together to form an aggregate-binder mix within the mixing chamber. The dryer/mixer also provides an aggregate inlet, such as openings 34 and/or virgin aggregate inlet 42, through which virgin aggregate may be passed into the dryer/mixer and/or the mixing chamber. Similarly, the dryer/mixer also provides a binder inlet, such as upper inlet 40, through which a binder may be passed into the mixing chamber. Lastly, the dryer/mixer provides a mix outlet, such as asphalt mix outlet 44, through which the aggregate-binder mix may be passed out of the mixing chamber.

Figure 5:
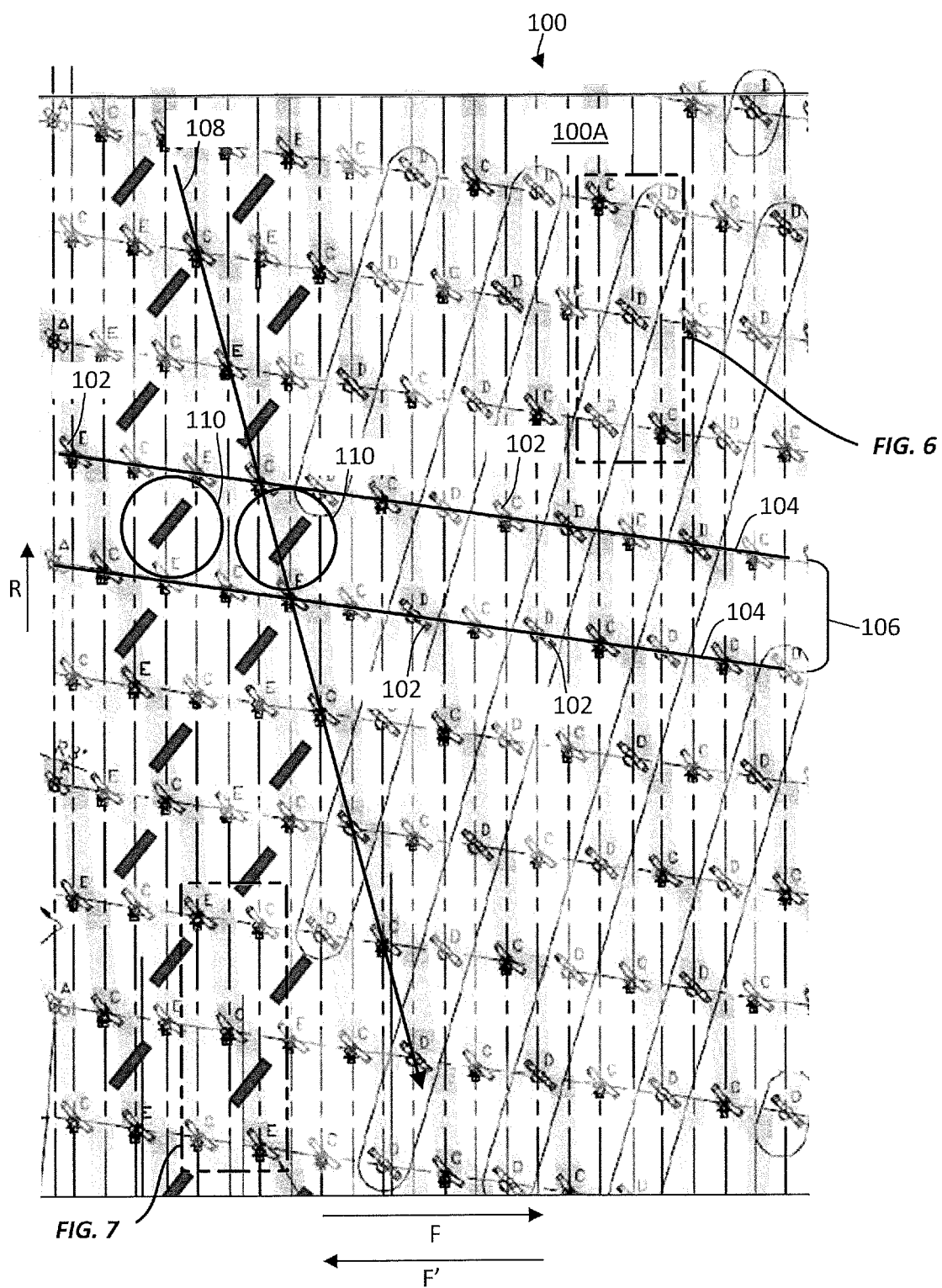
FIG. 5 is depicts the inner drum of FIG. 4, shown in a flat unrolled configuration to provide a layout map.

Now, with continued reference to FIG. 4 and with further reference to FIG. 5, a preferred inner drum 100 is shown in a flat "unrolled" configuration to provide a "layout map." According to certain preferred embodiments of the present invention, mixing paddles 102 are attached to the outer surface 100A of the inner drum 100 and are arranged in rows (two of which are generally shown by lines 104 in FIGS. 4 and 5). Preferably, mixing paddles 102 are placed in these rows 104 and are spaced continuously across the outer surface 100A of the inner drum 100 along an entire length of the mixing chamber. An interstitial space 106 is formed between each adjacent pair of rows 104 of mixing paddles 102. These interstitial spaces 106 are sized to allow aggregate and binder to pass through them. Next, material leads extend along at least a portion of the mixing chamber (one of which is generally shown by arrow 108 in FIG. 5). As noted above, material leads 108 are essentially the pathways that aggregate material and asphalt take as they move through the mixing chamber along the length of the inner drum 100. Lastly, at least one interstitial mixing paddle 110 is attached to the outer surface 100A of the inner drum 100.

Unlike the mixing paddles 102, which are placed along the rows 104, the interstitial mixing paddle 110 is preferably located in one of the interstitial spaces 106 between the rows. Interstitial mixing paddles 110 may each be located within a different one of two or more interstitial spaces 106. These two or more interstitial spaces 106 may each be adjacent one another or may not be located adjacent one another (i.e., such that there is at least one empty interstitial space between two interstitial spaces that are populated with a interstitial mixing paddle 110). The same or different numbers of interstitial mixing paddles 110 may populate different interstitial spaces 106. For example, in certain preferred embodiments, two interstitial mixing paddles 110 are located within a single interstitial space 106, while more than two (or fewer than two) interstitial mixing paddles are located within another interstitial space.

Unlike the mixing paddles 102, the interstitial mixing paddles 110 are preferably not spaced continuously across the outer surface 100A of the inner drum 100. On the other hand, like the mixing paddles 102, each interstitial mixing paddle 110 is preferably positioned at one of the material leads 108. Placing the paddles 102, 110 at the material leads 108 helps to ensure that the material moving along the material leads comes into contact with the paddles. For this reason, in preferred embodiments, each material lead 108 passes through each interstitial space 106 at least once along the length of the mixing chamber. Furthermore, in preferred embodiments, at least one mixing paddle 110 and/or interstitial mixing paddled 110 is positioned at each material lead 108.

Figure 7:
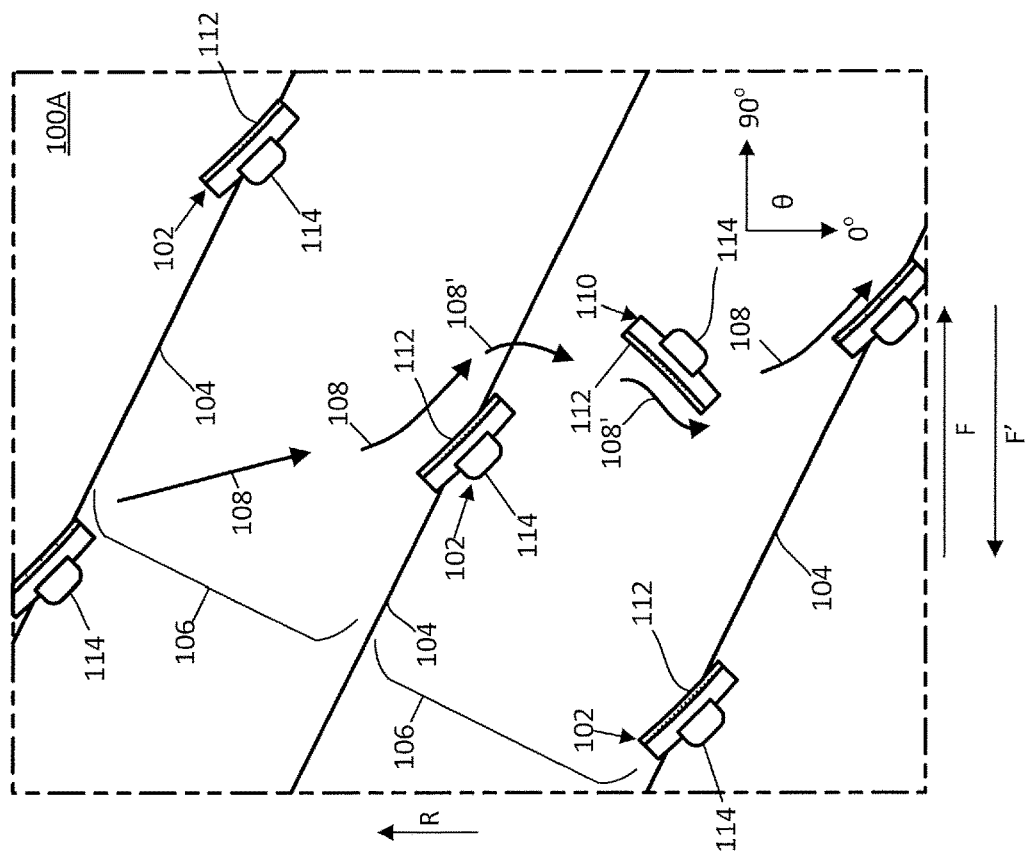
FIG. 7 is a detailed view of a boxed portion of the layout map of FIG. 5 denoted by "FIG. 7", which includes a reversed interstation paddle according to an embodiment of the present invention.
Figure 6:
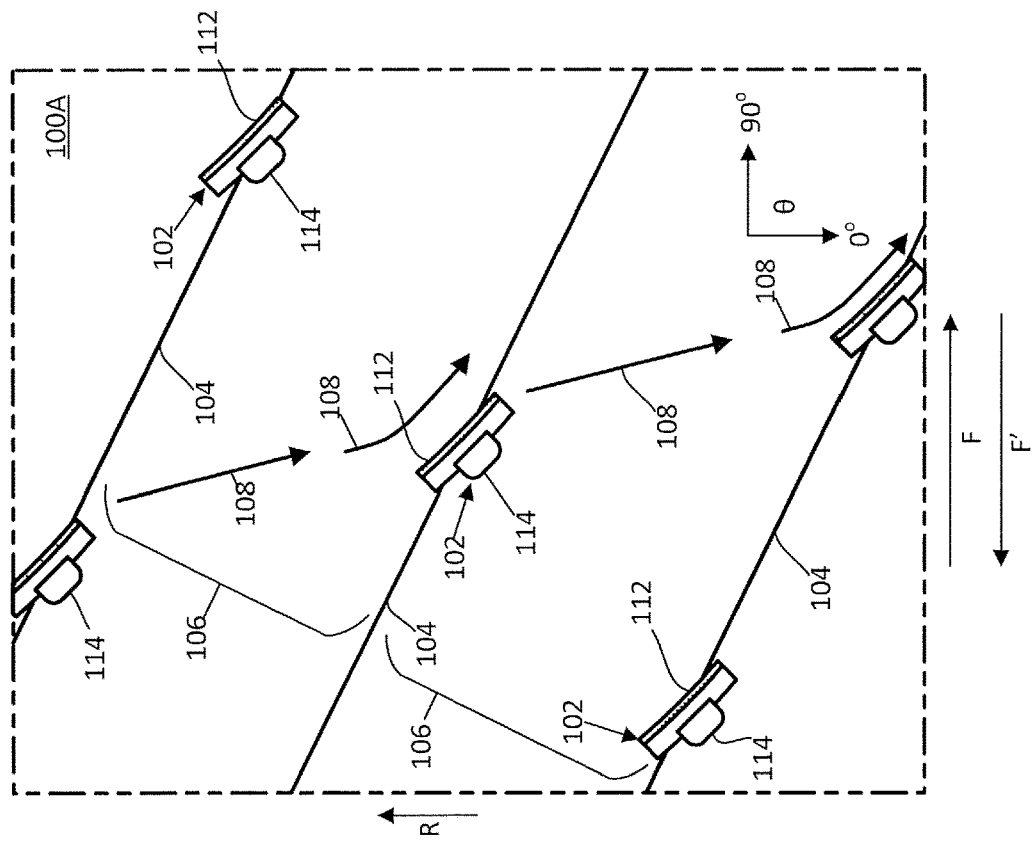
FIG. 6 is a detailed view of a boxed portion of the layout map of FIG. 5 denoted by "FIG. 6"

With continued reference to FIG. 4 and with further reference to FIGS. 6 and 7, the paddles 102, 110 each preferably include a leading face 112 for contacting (e.g., pushing) aggregate material during the mixing process, which is described in more detail below, and also a shank 114 for connecting the paddles to the outer surface 100A of the inner drum 100. Preferably, once the paddles 102, 110 are attached to the inner drum 100, each is fixedly held in a selected orientation (i.e., angle) with respect to the shank 114 and the inner drum 100. In this description, the orientation of the paddles 102, 110 is defined based on the orientation of the leading face 112. For example, the paddles 102, 110 are oriented at an angle θ equal to 0° when oriented vertically and the leading face 112 is pointed away from aggregate inlet 116 (shown in FIG. 4). The paddles 102, 110 are oriented at an angle θ equal to 90° when oriented horizontally (i.e., parallel with axis A) and the leading face 112 is pointed upwards away from the mixing chamber. In this particular embodiment, each of the mixing paddles 102 is oriented at an angle θ of approximately 45°. The orientation of the interstitial mixing paddle 112 is offset from the orientation of the mixing paddles 102 by approximately 90° and is, therefore, oriented at an angle θ of approximately 135°.

When the inner drum 100 is used to produce an aggregate mix, virgin aggregate and asphalt are first passed into the mixing chamber via the aggregate inlet and asphalt inlet, respectively. Next, the inner drum 100 is rotated about axis A (FIG. 4) in direction R. This rotation of the inner drum 100 causes the mixing paddles 102 and the interstitial mixing paddle 110 to each rotate through the mixing chamber of the dryer/mixer. The leading face 112 of each of the paddles 102, 110 tends to move and direct the aggregate (and asphalt) material within the mixing chamber. The motion of the mixing paddles 102 induces movement of a portion of the aggregate in a forward direction F away from aggregate inlet 116 as the inner drum 100 rotates. Similarly, like mixing paddles 102, the motion of the interstitial mixing paddle 110 induces movement of a portion of the aggregate as the inner drum 100 rotates. In each case, this movement of the aggregate facilitates the mixing of aggregate with the asphalt.

In general, aggregate material prefers or would tend to travel along the material leads 108 (in the direction indicated by the arrow) as a result of the location and orientation of the mixing paddles 102. Thus, as shown in FIG. 6, the aggregate material tends to travel from one mixing paddle 102 to the next mixing paddle in the forward direction F as the inner drum 100 is rotated. In some cases, the interstitial paddle 112 also causes the aggregate material to tend to travel from in the forward direction F. However, the direction that the aggregate material ultimately travels depends on the orientation (i.e., the angle θ) of the paddles 102, 110. As shown in FIG. 7, if one of the paddles 102, 110 is oriented at an angle θ that is greater than 90°, such that the right-hand side of the paddle is higher than the left-hand side (as viewed in FIG. 7), the paddle is likely to induce movement of the aggregate in a retrograde direction F' toward the aggregate inlet 4 instead of away from it. This is manifested by a flow of the aggregate material along reversed path 108' that is different from (and preferably opposite to) the material lead 108. An advantage of movement of aggregate in the retrograde direction F' is that such motion would increase the residence time and provide more time for mixing of aggregate and asphalt to occur.

Thus, in certain embodiments, it may be possible for mixing paddles 102 to direct aggregate material in two different direction. In those cases, for example, a first group of mixing paddles 102 may be arranged and oriented to induce movement of a portion of the aggregate in the forward direction F away from the aggregate inlet as the inner drum rotates in direction R. At the same time, a second group mixing paddles 102 induces movement of a portion of the aggregate in a retrograde direction F' towards the aggregate inlet as the inner drum rotates. Additionally or alternatively, the interstitial mixing paddle 110 may be configured to induce movement of a portion of the aggregate in either the forward direction F or in the retrograde direction F' as the inner drum rotates, depending on the angle θ of the interstitial mixing paddles.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. An inner drum for use in a dryer/mixer in connection with the production of an aggregate-mix, wherein the dryer/mixer includes a fixed outer drum surrounding the inner drum such that the inner drum may rotate within the outer drum, a mixing chamber formed between an outer surface of the inner drum and an inner surface of the outer drum, an aggregate inlet through which virgin aggregate may be passed into the mixing chamber, and a mix outlet through which the aggregate mix may be passed out of the mixing chamber, the inner drum further comprising:

a plurality of mixing paddles disposed on the outer surface of the inner drum and arranged in a plurality of rows, wherein the mixing paddles are configured to rotate through the mixing chamber as the inner drum rotates within the outer drum and to move the aggregate mix in a flow direction F away from the aggregate inlet as the inner drum rotates in rotation direction R;

an interstitial space formed between each adjacent pair of rows of mixing paddles;

a plurality of material leads that extend along the mixing chamber and along which aggregate material preferentially travels as a result of a location and orientation of the plurality of mixing paddles; and at least one interstitial mixing paddle disposed on the outer surface of the inner drum and located in one of the interstitial spaces and also positioned at one of the material leads, wherein the interstitial mixing paddle is configured to rotate through the mixing chamber as the inner drum rotates within the outer drum and to move the aggregate mix in a retrograde flow direction F' towards the aggregate inlet as the inner drum rotates in rotation direction R.

2. The inner drum of claim 1 wherein each of the material lead passes through each interstitial space.

3. The inner drum of claim 1 further comprising two or more interstitial mixing paddles that are all located within one of the interstitial spaces and that are each positioned at one of the material leads.

4. The inner drum of claim 1 further comprising an interstitial mixing paddle located within a different one of two interstitial spaces, wherein each interstitial mixing paddle is positioned at one of the material leads.

5. The inner drum of claim 4 wherein the two interstitial spaces are adjacent one another.

6. The inner drum of claim 4 wherein the two interstitial spaces are not adjacent one another.

7. The inner drum of claim 4 wherein a different number of interstitial mixing paddles are located in the two interstitial spaces.

8. The inner drum of claim 4 wherein an identical number of interstitial mixing paddles are located in each of the two interstitial spaces.

9. The inner drum of claim 1 further comprising at least one interstitial mixing paddle positioned at each material lead.

10. The inner drum of claim 1 further comprising a shank for connecting the mixing paddles and interstitial mixing paddle to the inner drum such that a leading face of each of the mixing paddles and the interstitial mixing paddle is fixed at a selected orientation with respect to the shank.

11. The inner drum of claim 8 wherein the selected orientation of a leading face of the interstitial mixing paddle is offset by approximately 90° compared to the selected orientation of the leading face of the mixing paddles.

12. The inner drum of claim 1 wherein the plurality of mixing paddles are spaced continuously across the inner drum along an entire length of the mixing chamber.

13. The inner drum of claim 12 comprising a plurality of interstitial mixing paddles, wherein the interstitial mixing paddles are not spaced continuously across the inner drum.

14. A plant configured for the batch production of asphalt comprising said dryer/mixer, mixing chamber, aggregate inlet, mix outlet, and inner drum of claim 1, wherein the fixed outer drum and the rotating inner drum are each cylindrical in shape, wherein the aggregate inlet is a an aggregate chute through which virgin aggregate may be passed into the inner drum, and wherein openings formed in the inner drum allow the virgin aggregate to pass from the inner drum in to the mixing chamber.

15. A method for forming an aggregate mix comprising the steps of:
   providing a dryer/mixer that includes: a fixed outer drum, an inner drum located within the outer drum, a mixing chamber formed between an outer surface of the inner drum and an inner surface of the outer drum, an aggregate inlet, an asphalt inlet, and a mix outlet, wherein the inner drum further includes:
      a plurality of mixing paddles disposed on the outer surface of the inner drum and arranged in a plurality of rows, an interstitial space formed between each adjacent pair of rows of mixing paddles, a plurality of material leads that extend along the mixing chamber and along which aggregate material preferentially travels as a result of a location and orientation of the plurality of mixing paddles, and at least one interstitial mixing paddle disposed on the outer surface of the inner drum and located in one of the interstitial spaces and also positioned at one of the material leads;
   passing virgin aggregate into the mixing chamber via the aggregate inlet;
   passing asphalt into the mixing chamber via the asphalt inlet;
   inducing movement of a portion of the aggregate in a forward direction F away from the aggregate inlet and along the plurality of material leads with the plurality of mixing paddles by rotating the inner drum in a direction R with respect to the outer drum such that the aggregate is mixed with the asphalt to form an aggregate mix;
   inducing movement of at least a portion of the aggregate with the interstitial mixing paddle by rotating the inner drum in the direction R; and
   passing the aggregate mix out of the mixing chamber via the mix outlet.

16. The method of claim 15 wherein the movement induced by the interstitial mixing paddle is in a retrograde direction F' toward the aggregate inlet.

\* \* \* \* \*